United States Patent [19]

Otrhalek et al.

[11] 4,108,669

[45] Aug. 22, 1978

[54] SNOW AND ICE CONTROL COMPOSITION

[75] Inventors: Joseph V. Otrhalek, Dearborn; Gilbert Stephen Gomes, Southgate, both of Mich.

[73] Assignee: IMC Chemical Group, Inc., Terre Haute, Ind.

[21] Appl. No.: 756,180

[22] Filed: Jan. 3, 1977

[51] Int. Cl.$^2$ ................................................ C09K 3/18
[52] U.S. Cl. ........................................ 106/13; 106/36; 252/70
[58] Field of Search ............... 106/36, 13; 252/70, 252/8.5 B; 404/19, 20; 71/59, 58; 427/136; 149/17; 51/308; 61/36 R

[56] References Cited

U.S. PATENT DOCUMENTS

| 1,371,032 | 3/1921 | Kendrick | 252/70 |
| 2,410,910 | 11/1946 | Wait | 252/70 |
| 2,716,068 | 8/1955 | Fain et al. | 252/70 |
| 2,898,216 | 8/1959 | Bray et al. | 106/36 |
| 2,942,993 | 6/1960 | Handy | 61/36 R |
| 2,979,463 | 4/1961 | Ferguson | 252/70 |

FOREIGN PATENT DOCUMENTS

| 2,148,505 | 4/1973 | Fed. Rep. of Germany | 252/70 |
| 1,189,448 | 4/1970 | United Kingdom | 149/17 |

Primary Examiner—Lorenzo B. Hayes
Attorney, Agent, or Firm—E. A. Figg; H. E. Post

[57] ABSTRACT

A snow and ice control composition and a process for employing said composition to improve traction on ice and snow covered surfaces. The composition comprising a particulate calcined montmorillonite clay, ammonium nitrate, and water does not promote corrosion of metals and is not harmful to vegetation.

4 Claims, No Drawings

SNOW AND ICE CONTROL COMPOSITION

BACKGROUND OF THE INVENTION

1. Field of the Invention

Snow and ice can create hazardous conditions on roads, sidewalks, parking lots, wherever there is either vehicular traffic or pedestrian traffic. It is most desirable that snow and ice control compositions meet certain criteria among which are first; efficiency of snow or ice control; secondly, it is desirable that the snow and ice control composition is non-corrosive to metals; thirdly, that it is biodegradable; and fourthly, that it does not damage plant life.

2. Prior Art

The prior art is replete with the use of sand or cinders to obtain traction, that is, to provide a gritty surface thus allowing vehicles and pedestrians to obtain traction. Additionally, sodium chloride or calcium chloride pellets may be employed to melt the ice and snow. Combinations of the two have been employed. In recent years attempts have been made to provide snow-ice control compositions which contain corrosion inhibitors to help prevent corrosion of metals. U.S. Pat. No. 3,630,913 teaches the use of a fluid de-icer composition containing urea, ammonium nitrate, ethylene glycol, water, and chromate salts to provide for non-corrosiveness of aluminum and magnesium metals. Another snow and ice control composition is taught in U.S. Pat. No. 3,928,221 which contains a mixture of urea, ethylene glycol and methanol.

SUMMARY OF THE INVENTION

It has been discovered that a suitable ice and snow control composition can be prepared by the addition of 1–20 percent by weight of ammonium nitrate by applying an aqueous solution of ammonium nitrate onto calcined montmorillonite clay.

DESCRIPTION OF THE PREFERRED EMBODIMENT

This invention relates to a snow and ice control composition and to a process for improving both vehicular and pedestrian traction on ice and snow covered surfaces by employing said composition. The most preferred snow and ice control composition consists of 90 parts by weight of a calcined montmorillonite clay, 5 percent ammonium nitrate, and 5 percent water. Higher or lower concentrations of ammonium nitrate may be employed. However, it is generally not desirable that the liquid addition to the calcined montmorillonite clay exceed 10 percent since clay has a tendency to break down at higher liquid levels. The preferred snow and ice control composition of this invention has been found to be effective in forming a non-skid surface at temperatures below 0° F. The composition is liberally sprinkled upon the ice and snow covered surfaces. After allowing sufficient time for the clay particles to melt down through the surface, a non-skid surface is afforded by the embedded clay particles. This composition is particularly useful in conjunction with melting ice and snow on highways, airport runways, sidewalks and in parking lots. It can be valuable to the driver of a vehicle who finds himself in an ice or snow situation which affords no traction for his vehicle. By simply dispersing the loaded calcined montmorillonite clay under the wheels of his vehicle and allowing sufficient time for the composition to work its way into the snow or ice he may then proceed on his way. The composition has the advantage that contrary to other snow and ice control compositions it is non-corrosive to metals and furthermore does not cause any damage to plant life. On the contrary the ammonium nitrate does act as a plant nutrient. Furthermore, the calcined montmorillonite clay is useful as a soil conditioning agent. When the composition is used on sidewalks and driveways near lawns, the ammonium nitrate and clay can be beneficial for the lawns in addition to providing for a non-skid surface on the snow and ice.

The montmorillonite clay may be composed of the following compounds in the ranges given below:

Table

| Compound | % Composition Range |
| --- | --- |
| $SiO_2$ | 49 – 67 |
| $Al_2O_3$ | 15 – 20 |
| $Fe_2O_3$ | 0.9 – 4 |
| $MgO$ | 1.3 – 4.1 |
| $CaO$ | 0.2 – 2.6 |
| $K_2O$ | 0.1 – 0.6 |
| $Na_2O$ | 0.1 – 2.8 |
| $TiO_2$ | 0.1 – 0.7 |
| $H_2O$ | 7 – 15 |

The clay of the invention is mined and predried at temperatures of about 212° F. It is then crushed to give a particle size of less than about 12 mm. It is then calcined at temperatures of from about 800° to about 1600° F., preferably at temperatures from about 1000° to about 1300° F. The particles are then ground and screened in order that the particle size ranges from 0.25 to 5 mm and preferably from 0.5 to 2 mm.

The concentration of ammonium nitrate in conjunction with the clay will depend on the absorptivity of the clay employed. This will generally range from 1–20 percent based on the weight of clay. Preferably an amount of ammonium nitrate ranging from about 1 to about 7 weight percent is employed. The most preferred composition consists of 90 weight percent clay, 5 weight percent ammonium nitrate and 5 weight percent water. The aqueous solution of ammonium nitrate may be sprayed onto the clay in any manner desired as is well known to those skilled in the art. It has been found advantageous, however, to employ a rotating inclined pan containing the clay. The temperature at which the clay is sprayed can range from about 20° to about 60° C. depending on the concentration of the ammonium nitrate solution employed.

The following Example is provided to further illustrate the invention.

EXAMPLE

A snow and ice control composition was prepared by spraying 10 parts of a 50% aqueous solution of ammonium nitrate onto 90 parts of a calcined montmorillonite clay 95% of which passed through a No. 8 sieve on a rotating inclined plane. This composition was then scattered upon a Petri dish containing an amount of ice to about a ¼ inch depth. The dish was placed in a freezer at −4° F. and allowed to remain there overnight. Upon removal of the dish it was found that the clay particles had become imbedded in the ice forming a non-skid surface by an apparent localized melting and refreezing of the ice. The clay had become imbedded in the ice without any application of pressure.

The embodiments of the invention in which an exclusive property or privilege is claimed are defined as follows:

1. A snow and ice control composition comprising a particulate calcined montmorillonite clay having a particle size in the range of from about 0.25 mm to about 5 mm, which contains from about 1 to about 20 percent by weight ammonium nitrate and from about 5 to about 9 percent by weight water.

2. The composition of claim 1 wherein the concentration of ammonium nitrate is from about 1 to about 7 weight percent.

3. The composition of claim 1 wherein the concentration of ammonium nitrate is 5 weight percent.

4. The composition of claim 1 wherein the particle size of the clay ranges from about 0.5 mm to about 2 mm.